US010210146B2

(12) United States Patent
Kohlmeier et al.

(10) Patent No.: US 10,210,146 B2
(45) Date of Patent: Feb. 19, 2019

(54) PRODUCTIVITY TOOLS FOR CONTENT AUTHORING

(71) Applicant: Microsoft Corporation, Redmond, WA (US)

(72) Inventors: Bernhard S. J. Kohlmeier, Seattlw, WA (US); Lorrissa Reyes, Seattle, WA (US); Pradeep Chilakamarri, Redmond, WA (US); Vernon William Southward, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 14/499,195

(22) Filed: Sep. 28, 2014

(65) Prior Publication Data
US 2016/0092416 A1     Mar. 31, 2016

(51) Int. Cl.
| | | |
|---|---|---|
| *G06F 17/30* | (2006.01) | |
| *G06F 3/048* | (2013.01) | |
| *G06F 17/24* | (2006.01) | |
| *G06F 3/0482* | (2013.01) | |

(52) U.S. Cl.
CPC ............ *G06F 17/24* (2013.01); *G06F 3/0482* (2013.01); *G06F 17/30657* (2013.01); *G06F 17/30864* (2013.01)

(58) Field of Classification Search
CPC .......... G06F 8/34; G06F 8/38; G06F 3/04847; G06F 8/20; G06F 8/36; G06F 3/0486
See application file for complete search history.

(56) References Cited

U.S. PATENT DOCUMENTS

| | | | |
|---|---|---|---|
| 5,724,595 | A | 3/1998 | Gentner |
| 6,112,203 | A | 8/2000 | Bharat et al. |
| 6,219,679 | B1 | 4/2001 | Brisebois et al. |
| 6,421,675 | B1 * | 7/2002 | Ryan ................... G06F 17/3061 |
| 6,480,837 | B1 * | 11/2002 | Dutta ................ G06F 17/30864 |
| 6,675,159 | B1 | 1/2004 | Lin et al. |

(Continued)

OTHER PUBLICATIONS

Merriam Webster dictionary, Encyclopedia definition, Oct. 28, 2013, pp. 1-3 http://www.merriam-webster.com/dictionary/encyclopedia.*

(Continued)

*Primary Examiner* — Scott T Baderman
*Assistant Examiner* — Mario M Velez-Lopez
(74) *Attorney, Agent, or Firm* — Talem IP Law, LLP

(57) ABSTRACT

An assisted content authoring productivity tool can provide a set of structured content related to at least one topic determined from a user's expression of intent. Additional information can be obtained about a selected result from the set of structured content through the assisted content authoring productivity tool by using the set of structured content as context for the further search. An item from the set of structured content can be inserted into a document in a content authoring surface of a content authoring application. The insertion may be carried out cross-device. Topics for the search of structured content can be determined using the user's expression of intent and, once available, the context can include the results of previous searches for the structured content related to at least one topic determined from the user's expression of intent. Each additional search results may provide further context in a recursive manner.

20 Claims, 9 Drawing Sheets

(56) References Cited

U.S. PATENT DOCUMENTS

| | | | |
|---|---|---|---|
| 6,912,694 B1* | 6/2005 | Harrison | G06F 3/0485 |
| | | | 715/784 |
| 7,080,076 B1* | 7/2006 | Williamson | G06F 17/24 |
| 7,213,198 B1 | 5/2007 | Hark | |
| 7,756,850 B2 | 7/2010 | Keith, Jr. | |
| 7,831,601 B2 | 11/2010 | Oral et al. | |
| 7,984,035 B2 | 7/2011 | Levin et al. | |
| 8,046,387 B2 | 10/2011 | Nelson | |
| 8,352,397 B2 | 1/2013 | Rubin et al. | |
| 8,380,723 B2 | 2/2013 | Radlinski et al. | |
| 8,452,769 B2 | 5/2013 | Altaf et al. | |
| 8,479,094 B2 | 7/2013 | Fouts | |
| 8,560,485 B2 | 10/2013 | Labrou et al. | |
| 8,583,673 B2 | 11/2013 | Tarek et al. | |
| 8,676,815 B2 | 3/2014 | Deng et al. | |
| 9,053,190 B1* | 6/2015 | Boenau | G06F 17/30867 |
| 9,213,470 B2 | 12/2015 | Yoshida | |
| 9,792,015 B2 | 10/2017 | Baer et al. | |
| 2004/0093559 A1 | 5/2004 | Amaru et al. | |
| 2005/0091578 A1 | 4/2005 | Madan et al. | |
| 2005/0154760 A1* | 7/2005 | Bhakta | G06F 17/2229 |
| 2006/0004892 A1 | 1/2006 | Lunt et al. | |
| 2006/0085469 A1* | 4/2006 | Pfeiffer | G06F 17/30707 |
| 2006/0184512 A1* | 8/2006 | Kohanim | G06F 17/30991 |
| 2008/0071803 A1 | 3/2008 | Boucher | |
| 2008/0104061 A1 | 5/2008 | Rezaei | |
| 2008/0229244 A1* | 9/2008 | Markus | G06F 17/30867 |
| | | | 715/811 |
| 2008/0281793 A1* | 11/2008 | Mathur | G06F 17/30023 |
| 2009/0300547 A1 | 12/2009 | Bates et al. | |
| 2009/0327264 A1 | 12/2009 | Yu et al. | |
| 2010/0077290 A1 | 3/2010 | Pueyo | |
| 2010/0082570 A1* | 4/2010 | Altaf | G06F 17/30637 |
| | | | 707/706 |
| 2010/0082610 A1* | 4/2010 | Anick | G06F 17/2235 |
| | | | 707/723 |
| 2010/0125781 A1* | 5/2010 | Gadacz | G06F 17/30893 |
| | | | 715/234 |
| 2010/0325535 A1 | 12/2010 | Reddy | |
| 2011/0026901 A1* | 2/2011 | Kashima | G11B 27/034 |
| | | | 386/282 |
| 2011/0078615 A1 | 3/2011 | Bier | |
| 2011/0083167 A1* | 4/2011 | Carpenter | G06F 17/30563 |
| | | | 726/4 |
| 2011/0087661 A1 | 4/2011 | Quick et al. | |
| 2011/0093459 A1 | 4/2011 | Dong et al. | |
| 2011/0099464 A1 | 4/2011 | Marashi et al. | |
| 2011/0107149 A1 | 5/2011 | Cui | |
| 2011/0119248 A1 | 5/2011 | Abe et al. | |
| 2011/0238650 A1 | 9/2011 | Jenkins et al. | |
| 2011/0252060 A1 | 10/2011 | Broman et al. | |
| 2012/0136887 A1* | 5/2012 | Cha | G06F 17/3064 |
| | | | 707/767 |
| 2012/0151310 A1 | 6/2012 | El-Kalliny | |
| 2012/0191716 A1 | 7/2012 | Omoigui | |
| 2012/0198381 A1 | 8/2012 | Kumamoto | |
| 2012/0265767 A1 | 10/2012 | Brdiczka et al. | |
| 2012/0284245 A1* | 11/2012 | Portnoy | G06Q 30/02 |
| | | | 707/706 |
| 2012/0317109 A1 | 12/2012 | Richter et al. | |
| 2013/0036348 A1 | 2/2013 | Hazard | |
| 2013/0086526 A1* | 4/2013 | Nowakowski | G06F 3/0482 |
| | | | 715/825 |
| 2014/0136468 A1 | 5/2014 | Faratin et al. | |
| 2014/0136506 A1* | 5/2014 | Ratner | G06F 17/30864 |
| | | | 707/706 |
| 2014/0164890 A1 | 6/2014 | Fox et al. | |
| 2014/0173426 A1 | 6/2014 | Huang et al. | |
| 2014/0176607 A1 | 6/2014 | Yang et al. | |
| 2014/0188925 A1* | 7/2014 | Skolicki | H04N 21/4622 |
| | | | 707/765 |
| 2014/0281850 A1 | 9/2014 | Prakash et al. | |
| 2014/0289597 A1 | 9/2014 | Kim | |
| 2015/0100562 A1 | 4/2015 | Kohlmeier et al. | |
| 2015/0120700 A1 | 4/2015 | Holm et al. | |
| 2016/0188143 A1 | 6/2016 | Kohlmeier et al. | |
| 2016/0357842 A1 | 12/2016 | Kohlmeier et al. | |

OTHER PUBLICATIONS

Britannica Researcher, Jan. 6, 2013, pp. 1-2 (https://web.archive.org/web/20130106191050/http://office.microsoft.com:80/en-us/store/britannica-researcher-WA102924944.aspx).*

Boubas, et al, "Social content authoring with no social traps", In International Conference on Collaboration Technologies and Systems (CTS), May 20, 2013, 4 Pages.

"International Search Report and Written Opinion in PCT Application No. PCT/US2015/052534", dated Jan. 4, 2016, 10 Pages.

Bosnic, et al., "Automatic Keywords Extraction—a Basis for Content Recommendation", In Proceedings of the Fourth International Workshop on Search and Exchange of e-learning Materials, Sep. 27, 2010, 10 pages.

Crystal, Abe, "Interface Design for Metadata Creation", In Proceedings of the Human Factors in Computing Systems Conference, Apr. 5, 2003, 2 pages.

Paris, et al., "Capturing the User's Reading Context for Tailoring Summaries", In Proceedings of 17th International Conference User Modeling, Adaptation, and Personalization: Formerly UM and AH, Jun. 22, 2009, 6 pages.

Weng, et al., "Exploiting Item Taxonomy for Solving Cold-start Problem in Recommendation Making", In 20th IEEE International Conference on Tools with Artificial Intelligence, vol. 2 , Nov. 3, 2008, 8 pages.

Oral, et al., "Dealing with the Cold Start Problem when Providing Personalized Enterprise Content Recommendations", Retrieved on: Dec. 11, 2013, Available at: http://www.parc.com/content/events/attachments/Oral_revised_Group10.pdf.

Middleton, et al., "Exploiting Synergy Between Ontologies and Recommender Systems", In proceedings of International Workshop on the Semantic Web, May 7, 2002, 10 pages.

Melville, et al., "Content-Boosted Collaborative Filtering for Improved Recommendations", In Proceedings of the Eighteenth National Conference on Artificial Intelligence, Jul. 2002, 6 pages.

"Second Written Opinion Issued in PCT Application No. PCT/US2015/052534", dated Aug. 11, 2016, 5 Pages.

"International Preliminary Report on Patentability Issued in PCT Patent Application No. PCT/US2015/052534", dated Dec. 13, 2016, 6 Pages.

"Document Collaboration and Co-Authoring", Retrieved from: https://support.office.com/en-gb/article/Document-collaboration-and-co-authoring-ee1509b4-1f6e-401e-b04a-782d26f564a4?ui=en-US&rs=en-GB&ad=GB, Retrieved on: Mar. 13, 2015, 5 Pages.

"Enterprise Content Creation", Retrieved from: https://web.archive.org/web/20150315210239/http://www.objective.com/products/enterprise-content-creation/collaborative-authoring, Retrieved on: Mar. 15, 2015, 3 Pages.

"Reference Manager", Retrieved from: https://web.archive.org/web/20111227034641/http://www.refman.com/rmwhatsnew.asp, Dec. 2010, 2 Pages.

"Final Office Action Issued in U.S. Appl. No. 14/729,644", dated Oct. 5, 2017, 20 Pages.

"Final Office Action Issued in U.S. Appl. No. 14/729,644", dated Sep. 19, 2018, 19 Pages.

"Non Final Office Action Issued in U.S. Appl. No. 14/729,644", dated May 30, 2017, 21 Pages.

"Non Final Office Action Issued in U.S. Appl. No. 14/729,644", dated May 9, 2018, 23 Pages.

"Final Office Action Issued in U.S. Appl. No. 14/738,091", dated Mar. 7, 2018, 29 Pages.

"Non Final Rejection Issued in U.S. Appl. No. 14/738,091", dated Sep. 11, 2017, 26 Pages.

Li, et al., "Online Web-Video Topic Detection and Tracking with Semi-supervised Learning", In Proceedings of the 14th Pacific-Rim Conference on Advances in Multimedia Information Processing-PCM 2013—vol. 8294, Dec. 13, 2013, pp. 750-759.

(56) References Cited

OTHER PUBLICATIONS

"International Preliminary Report on Patentability Issued in PCT Application No. PCT/US2015/052653", dated May 9, 2017, 6 Pages.
"International Search Report & Written Opinion Issued in PCT Application Nuo. PCT/US2015/052653", dated Dec. 23, 2015, 10 Pages.
"Second Written Opinion Issued in PCT Application No. PCT/US2015/052653", dated Mar. 10, 2017, 5 Pages.
"International Preliminary Report on Patentability Issued in PCT Application No. PCT/US2016/035364", dated Apr. 25, 2017, 07 Pages.
"International Search Report and Written Opinion Issued in PCT Application No. PCT/US2016/035364", dated Jul. 27, 2016, 11 Pages.
"Second Written Opinion Issued in PCT Application No. PCT/US2016/035364", dated Jan. 25, 2017, 6 Pages.
"Non Final Office Action Issued in U.S. Appl. No. 14/738,091", dated Oct. 2, 2018, 29 Pages.

* cited by examiner

PRODUCTIVITY TOOLS FOR CONTENT AUTHORING

BACKGROUND

Productivity applications can include a variety of tools and information that facilitate the accomplishment of a variety of tasks related to producing content, including creating and editing content within different types of documents such as word processing documents, spreadsheets, and presentations. In some cases, productivity applications can be considered to be, or to include, content authoring applications.

While creating and editing content within a productivity application, a user may start with a blank page, information "borrowed" from other sources, or from an existing document. The blank page is a well-known challenge for many people trying to get started creating a document—whether it is a homework assignment, a white paper, a journal, a schedule, or other task.

BRIEF SUMMARY

Techniques and systems for facilitating content authoring are presented. Productivity tools are described that can help a user get past the blank page and begin authoring content. In addition, contextual recommendations can be provided to the user from a cold start of the blank page through further exploration of a recommended or requested topic. The information provided as part of the contextual recommendations can be incorporated easily into the user's document to initiate, supplement, and/or enhance the creation process.

Methods of assisting content authoring can include providing a user input interface through which a user can input an expression of intent related to an outcome and/or subject of the content authoring project. The expression of intent can be analyzed to identify one or more topics for the expression. Structured content relevant to the one or more topics for the expression can be retrieved and provided for inclusion into a document. Additional content can be retrieved based on user selection of the structured content and context for the user selection including at least a previously retrieved structured content. An outline based on the structured content can be inserted into a document.

An assisted content authoring tool and corresponding application service carrying out the described methods can be provided for productivity applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
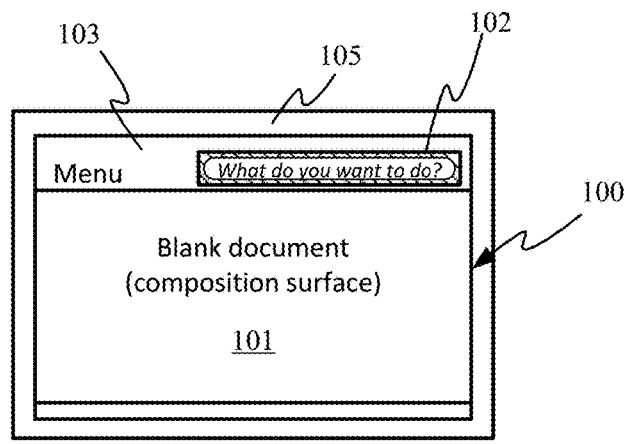
FIGS. 1A and 1B illustrate simplified representations of a graphical user interface of a productivity application and associated productivity tool user input interface provided on a single device (FIG. 1A) and across multiple devices (FIG. 1B).

Techniques and systems for facilitating content authoring are presented. Productivity tools for assisted content authoring are described that can help a user get past the blank page and begin authoring content in a productivity application or other content authoring application.

Examples of productivity applications include the Microsoft Office® suite of applications from Microsoft Corp., including Microsoft Word®, Microsoft Excel®, Microsoft PowerPoint®, as well as the web application components thereof, all registered trademarks of Microsoft Corp.; Google Docs (and Google Drive™); the Apache OpenOffice™ available from the Apache Software Foundation; the LibreOffice® suite of applications available from The Document Foundation, registered trademarks of The Document Foundation; and the Apple iWork® suite of applications from Apple Inc, including Apple Pages®, Apple Keynote®, and Apple Numbers®, all registered trademarks of Apple Inc.

In some cases, features of the productivity tools described herein may be incorporated into any of the productivity applications. In some cases, the productivity tools described herein may be an add-on feature or application for an existing productivity application or other content authoring application through which content authoring may take place. In addition, systems supporting the described productivity tools can be used by various productivity applications.

Productivity applications and other content authoring applications incorporating the described productivity tools may be delivered as software services from what is colloquially referred to as "the cloud". In these deployments, a local application may run on a user's device that provides a user interface to an application service hosted in a data center or some other computing environment. For example, in some cases, the user interface to a productivity application may be generated on a local computer, tablet or a smartphone; or the user interface to the productivity application may be generated from a cloud server and sent to a client for rendering. The user interface may be generated as part of a service. In some cases, the user interface may be integrated with other services, such as social networking services and/or information management services.

The files (e.g., documents, presentations, notebooks, spreadsheets, and the like) that a user works with may be stored locally, may be stored by the service, and/or may be stored by an associated cloud-based storage service. Any number of computing devices may be leveraged to take advantage of such services, including, but not limited to, mobile devices, smart phones, laptops, tablets, desktop computers, and any other suitable platform.

Constant context switching can occur between a search engine-based web browser and a content authoring application when a user is researching a topic and copying and pasting from a web page to a document or other file. In some cases, to minimize context switching, a topic research capability can be incorporated into a productivity application, for example, by creating a search bar within, or accessible by, the productivity application. In some cases, instead of a user having to input search queries, relevant information can be presented to a user as part of a recommender system for the productivity application.

In a recommender system, recommendations are generally made based on context. However, the blank page creates a "cold start" scenario where there is insufficient information for a system to use to draw inferences for providing a recommendation to a user.

According to various implementations described herein, the cold start scenario is addressed by providing a user input interface for assisted content authoring through which a user can express their intent related to an outcome and/or subject of the content authoring project. An outcome refers to the end product that the user desires to have accomplished. A subject refers more specifically to a person, place, thing, or idea that is doing or being something. An intent related to a subject refers to an intent to know more about the subject; whereas an intent related to an outcome may involve a goal or task in addition to knowledge about a subject. For example, an intent to "write" refers to an intent to perform an activity, an intent to "write about a famous tennis player" refers to an intent related to a subject (e.g., to know more about a tennis player) and an intent to "write a paper about a famous tennis player" refers to an intent related to an outcome of a paper about the tennis player. When the phrase or term "a user's intent" or "expression of intent" is used herein, it is intended to refer to an intent related to the outcome and/or subject of the content authoring project.

In some cases, the cold start scenario may be further supplemented with signals from other context (outside of the productivity application instance), such as email, an enterprise directory or collaborative file, web browsing history, or even prior authored content created by that user (or some other specified user or group of users). Sometimes the context signals are user specific and sometimes the context signals are based on collective information (across multiple users).

The user input interface can include an input field that can receive the user's expression of intent via a typing keyboard, a touch keyboard or display, a motion gesture, a touch gesture, a stylus (e.g., "inking"), head, eye and gaze tracking, brain activity, or voice input. In some cases, the input field can be provided as part of a menu, tool bar, task bar/pane, or other graphical user interface element located on a same or different visual display as a content authoring surface of a productivity application. Although specific implementations are described with respect to graphical user interfaces, it should be understood that natural user interface (NUI) components may be used in addition to or in place of graphical user interface components.

Figure 1B:
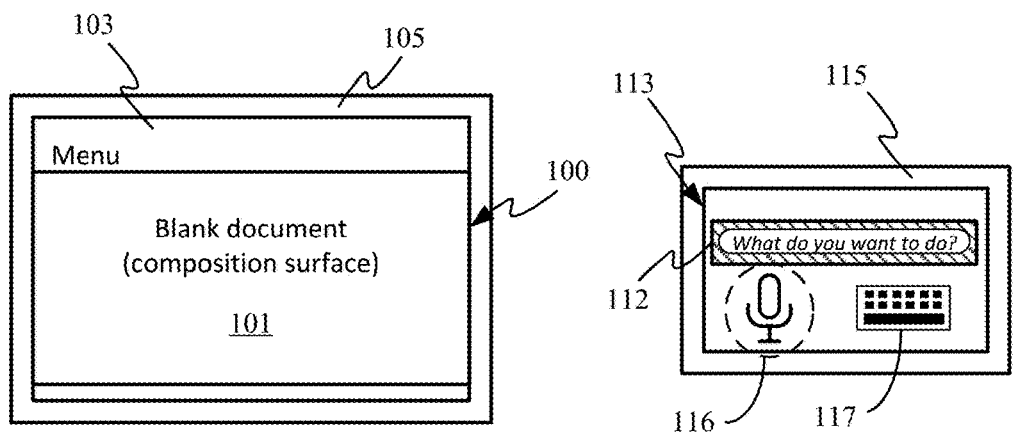

FIGS. 1A and 1B illustrate simplified representations of a graphical user interface of a productivity application and associated productivity tool user input interface provided on a single device (FIG. 1A) and across multiple devices (FIG. 1B).

Referring to FIG. 1A, a graphical user interface 100 of a productivity application or other content authoring application may initially have a content authoring surface 101 in a blank state, for instance due to a default state for a "new" document (or other file type). An entry point to an assisted content authoring productivity tool may be an input field 102 available as part of a tool bar 103 for the productivity application. The graphical user interface 100 can be rendered on a display screen 105 associated with a computing device (which can be a computing system 800 such as described with respect to FIG. 8). In some cases, the display screen may be physically connected to a processing system of the computing device, for example, by cables or by being built into a package containing the processing system of the computing device. In some cases, the display screen may be wirelessly connected to the processing system. In some cases, the display screen is any surface on which the graphical user interface is projected. Such surfaces include a wall, an object surface, a body surface, or even what appears to be in space (e.g., a "hovering display" using a projector and prism or a virtual retinal display).

Other entry points to the assisted content authoring productivity tool are contemplated. For example, the entry point may be directly from the content authoring surface 101. As another example, in FIG. 1B, instead of including the entry point to the assisted content authoring productivity tool as part of the tool bar 103 in the graphical user interface 100 of the productivity application, the entry point to the assisted content authoring productivity tool can be provided on a separate device. For example, an input field 112 can be provided as part of a user input interface 113 of an instance of the productivity application or an instance of the productivity tool running on a separate device 115. Although voice input 116 and text input 117 are illustrated, it should be understood that any suitable input device or functionality may be used (including gestural, non-contact input and motion-based). The separate device 115 may be embodied as a computing system 800 such as described with respect to FIG. 8.

The separate device 115 may either communicate directly with the computing device associated with the display screen 105 or may communicate with a productivity application service (e.g., available from a "cloud" service or available from an enterprise server or the like) so that information may be exchanged between the applications running on the two devices. For example, input to the user input interface 113 can affect what is input to or read from the content authoring surface 101. Where the display 105 is a large-scale touch sensitive display, such as the Samsung SUR40 with Microsoft PixelSense™, the input field 112 of the user input interface 113 may, in some cases, be provided on a separate region of the display screen than that displaying the graphical user interface 100 of the productivity application.

Through the user input interface to assisted content authoring (e.g., 102, 112), the productivity tool can receive an indication of a user's intent. The productivity tool can receive any arbitrary request representing a user's expression of intent. For example, a user can input an expression having a topic and/or action request in the form of a natural language statement or query concerning what they want to do. As some illustrative examples, the user may input the expression "I want to write a paper about Albert Einstein," "How to grow grapes," or "have to discuss the Great Gatsby." The request does not have to be a complete sentence; rather, the natural language aspect of the input field refers to the flexibility of the structure of the request.

For examples, in some cases, fill-in-the-blank style input fields can be used to facilitate the entry of topic information.

The productivity tool can then take the user's request that was input through the input field 102, 112 and generate information relevant to the user's intent for the document. The user's expression of intent (as related to outcome and/or subject) provides at least part of an initial nucleus of context from which the productivity tool can generate the information. In some cases, the user's expression of intent can be used with one or more items of context about the user (with user permission) such as but not limited to recorded user interests, their field of work, their authoring history, and the documents (or other files) the user previously accessed or read. The generated information can be presented to the user so that the user can further explore the topics (and entities) described in the generated information and/or begin working within the document (or other file).

Figure 2A:
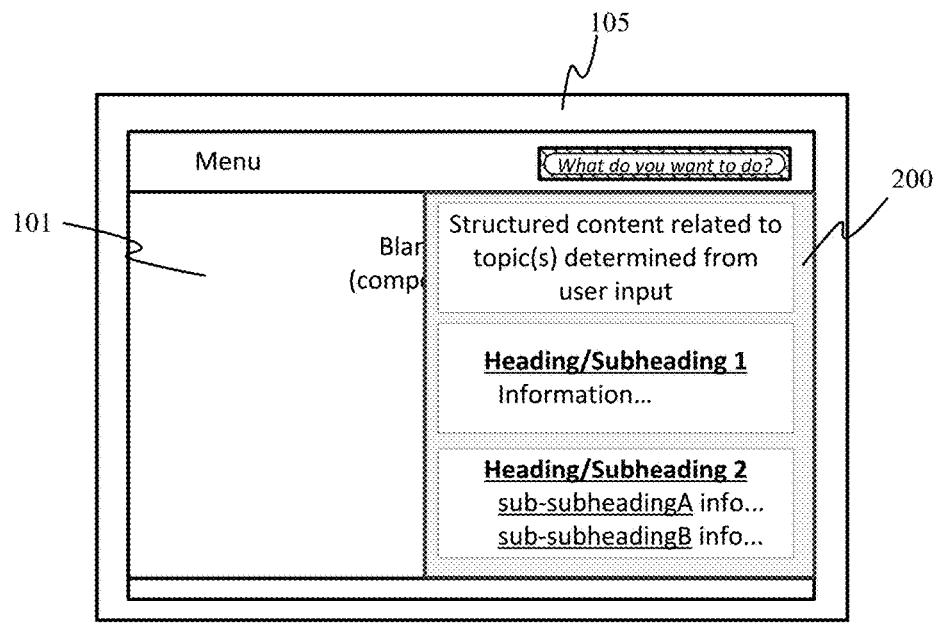
FIGS. 2A and 2B illustrate simplified representations of a graphical user interface of a productivity application and associated productivity tool user input interface with relevant content provided on a single device (FIG. 2A) and across multiple devices (FIG. 2B).
Figure 2B:
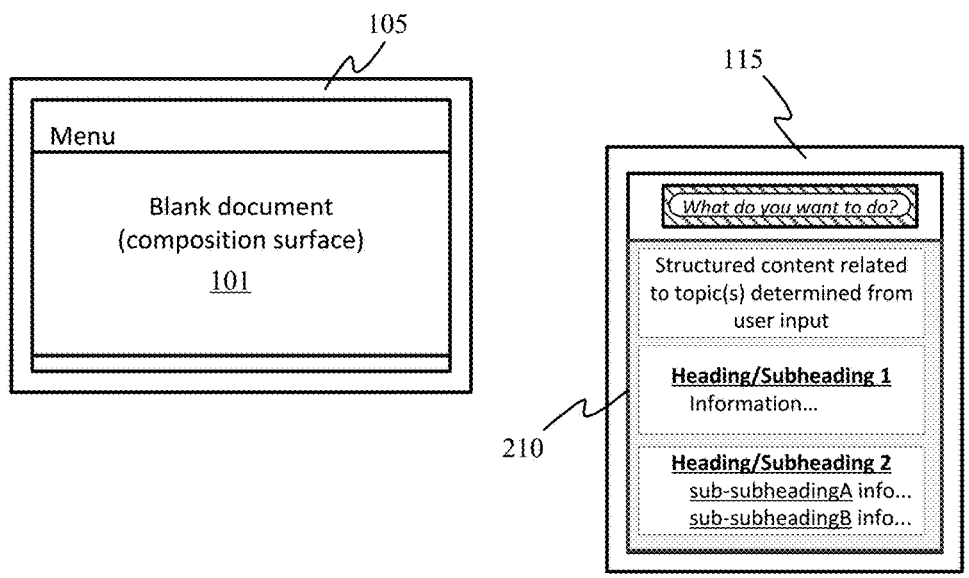

FIGS. 2A and 2B illustrate simplified representations of a graphical user interface of a productivity application and associated productivity tool user input interface with relevant content provided on a single device (FIG. 2A) and across multiple devices (FIG. 2B). In FIG. 2A, the productivity tool for assisted content authoring can surface the structured content related to the topic(s) determined from user input in an interface (e.g., a panel 200) overlaying the content authoring surface 101 on the display screen 105.

The panel 200 can be part of a graphical user interface for the productivity tool in which information and available commands can be presented to a user. A user can interact with the user interface represented in the panel 200 to initiate actions carried out by the productivity tool.

It should be understood that the graphical user interface to the productivity tool for assisted content authoring may be may be integrated as part of a single graphical user interface (e.g., of the productivity application and/or the device on which the interfaces are displayed), or the graphical user interface to the productivity tool for assisted content authoring may be a separate graphical user interface from the graphical user interface to the productivity application (e.g., as a separate window, as an independent display, or as a separate software component that communicates with but is not intrinsic to the productivity application)s, or the two aforementioned graphical user interfaces.

In the case illustrated in FIG. 2B, the structured content may be surfaced in a window 210 (or panel or other type of graphical user interface screen) rendered on the separate device 115 (or in a separate window from the content authoring surface 101 on the display screen 105).

Figure 3:
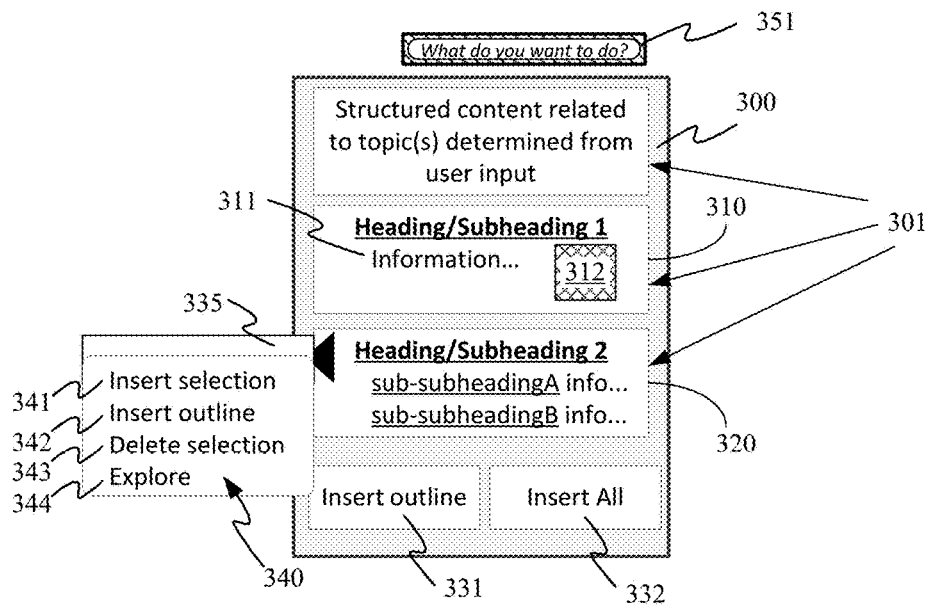
FIG. 3 illustrates example representative components of a user interface to a productivity tool for assisted content authoring.

User interface elements that may be present in the panel 200 or window 210 include input controls, navigational components and informational components. FIG. 3 illustrates example representative components of a user interface to a productivity tool for assisted content authoring.

As shown in FIG. 3, informational components in the interface 300 can be used to display structured content 301 related to topic(s) determined from the user input. In some cases, the structured content 301 can be presented in the form of a preview of one or more related content of relevant information from one or more sources. The preview can be based on the recognized entities of the information being presented. The relevant information can be generated by a recommender engine that determines at least one topic and/or entity input as part of the user's request, performs a lookup and/or search from a source accessible over a network, and retrieves structured information from the lookup and/or search to present such information back to the user.

The sources at least initially accessed by the recommender engine provide structured content. In one implementation, information from an Internet encyclopedia such as Wikipedia is accessed and retrieved. The content can be considered structured content because the content has metadata associated therewith. Content may, in some cases, be considered to be structured based on the inclusion of recognizable formatting (e.g., lists, tables, styles). The structured information provided by the assisted content authoring productivity tool can help a user discover aspects about and around their original request topic(s).

For example, an Internet encyclopedia entry can have a structure including headings, subheadings, sub-subheadings, and nested content (along with other metadata). Nested content refers to content that relates to a linking topic of which some information is provided within the main entry. For example, an article on Dwight D. Eisenhower includes content related to the 1960 U-2 incident that is itself covered in a separate article. The nested 1960 U-2 incident information includes a nested linking topic with content related to Captain Francis Gary Powers.

The structured content presented in the interface 300 can be provided in content views 310, 320, which may be in the form of a preview, a template version (e.g., the particular presentation based on an entity model, "entity-based template") or some other presentation of the retrieved information. For example, one content view 310 may include text 311 and images 312; and another content view 320 may include multiple headings, subheadings, and/or sub-subheadings. The view may be based on the source, the type of structure received and/or recognized entities in the structured content. It should also be understood that the structured content can include text, images, audio, video, and visual content.

The productivity tool can include commands for a user to explore the information presented within the interface 300 and, in some cases, to insert such information into the composition surface of the productivity application.

In some cases, the assisted content authoring tool can be used to insert an outline of a topic based on the topic model associated with the structured information retrieved by the productivity tool. A topic model contains, as structured data, a number of properties, or attributes. The topic model can influence how the information is visually presented with information and, in some cases, influence what actions may be carried out with respect to the information. A user may copy visual content directly from the displayed information or may use the commands available to the user via the productivity tool. In some cases, a user may save or otherwise mark some of the visual content for later insertion or exploration.

Commands may be initiated by a user via, for example, selection of an icon, voice input, gestural or touch input, and the like. Example actions that the assisted content authoring tool may provide include insertion of an outline, insertion of a complete page of content retrieved for the topic, insertion of a selected portion, and insertion of a representation of an entity model. Not only can the specific content displayed in the interface 300 be inserted into the document (or other composition surface), but because the retrieved information is of structured content, specific attributes and/or entity models may be used when inserting content into the document. For example, an entity model for a person may include a picture and certain standard information about that person (e.g., date of birth, spouse(s), children, parents, etc.).

In the illustrated example, command options can include inserting an outline (331) based on the structured content 301 (e.g., headings, subheadings, etc. for all or some of the results in the interface 300) and inserting all (332) or some of the results in the interface 300. Selection of content view 320 can surface a menu 335 (e.g., a contextual menu, a drop-down menu, etc.) providing commands 340 for, as non-limiting examples, inserting the selected content (341), inserting an outline based on the selected content (342), deleting the selection from the content provided in the interface (343), and even exploring the selected content (344). The exploring of the selected content (344) may be initiated via a menu command or by some other gesture or user input, for example, by a swiping or touching of the particular information.

A user input interface 351 for receiving a user's expression of intent may optionally remain available for a user to restart or modify their expressed intent.

Figure 4A:
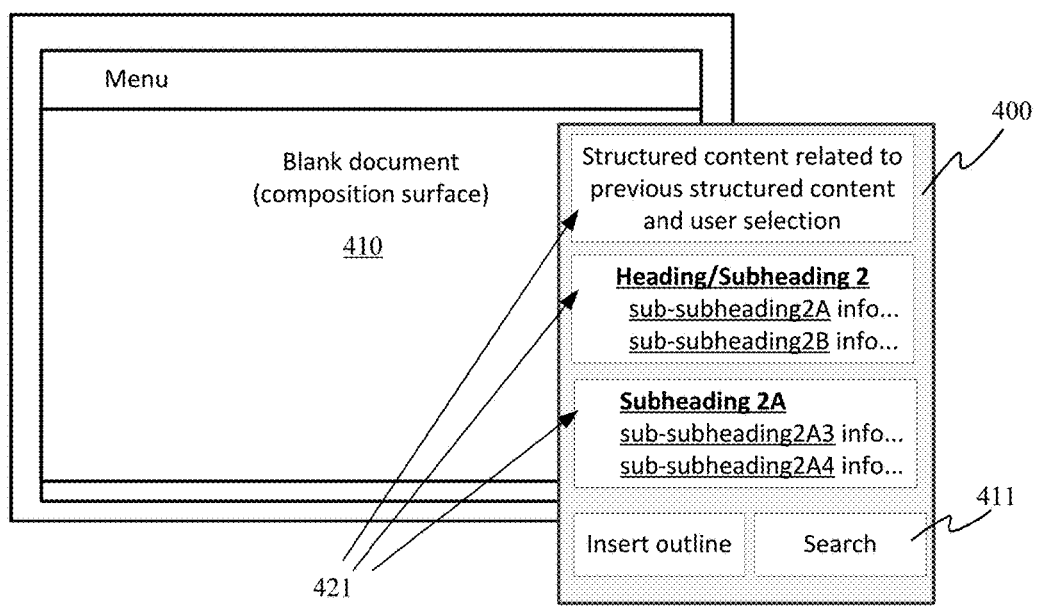
FIGS. 4A-4C illustrate a user scenario for assisted content authoring.
Figure 4B:
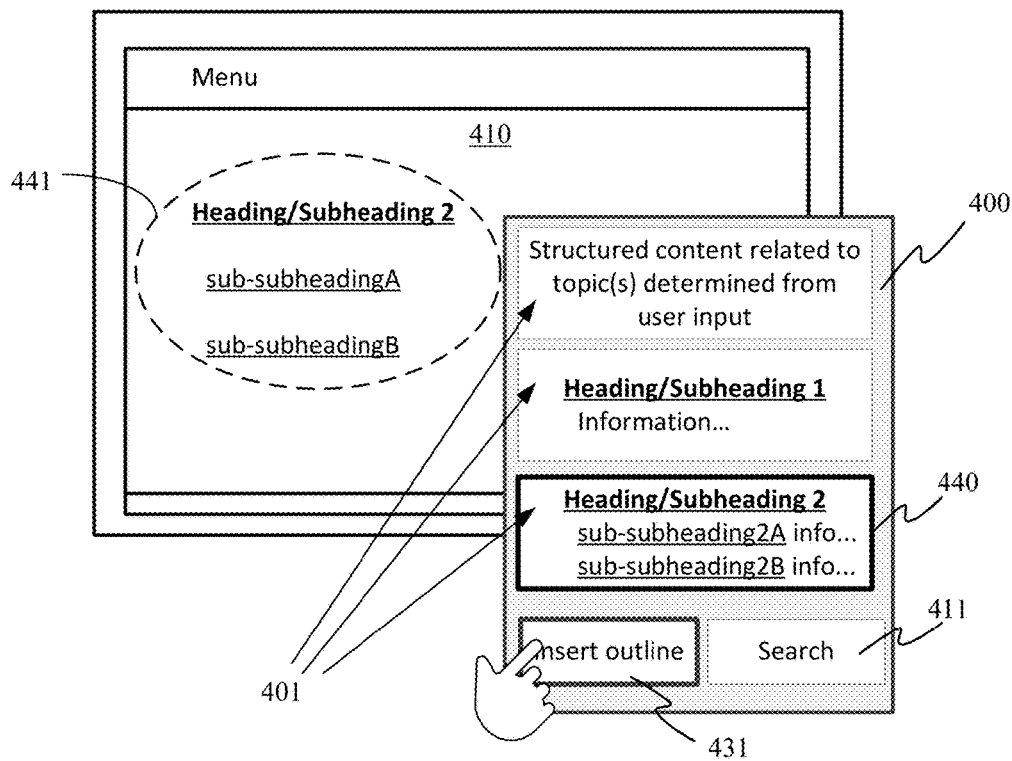
Figure 4C:
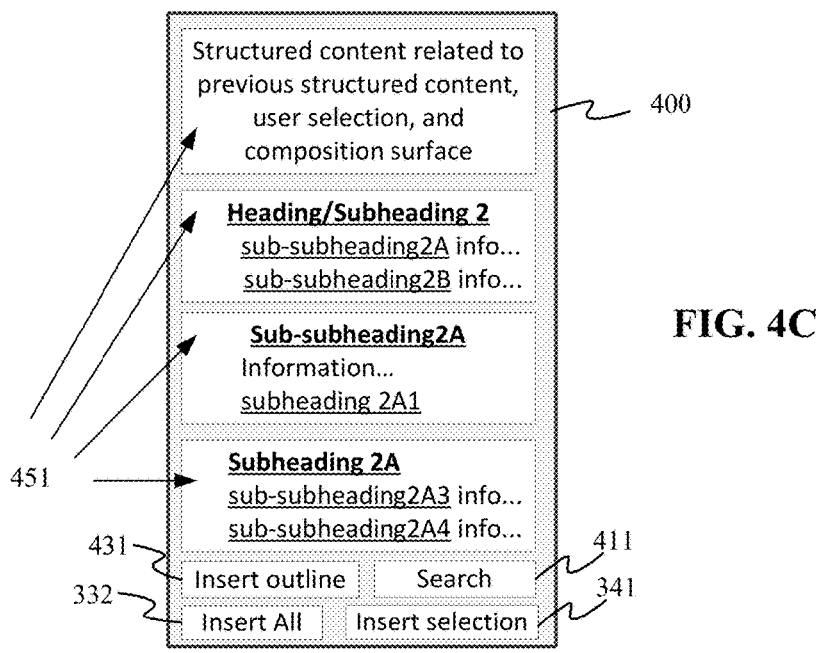

FIGS. 4A-4C illustrate a user scenario for assisted content authoring. The scenario illustrated in FIGS. 4A-4C begins from a state in which an expression has been entered via a user input interface to the assisted content authoring productivity tool and an interface 400 is provided with structured content 401 (see FIG. 4B or interface 300 with structured content 301 of FIG. 3). The interface 400 for the productivity tool for assisted content authoring may be provided on a same or different display (or device) than the interface to the productivity application or other content authoring application (e.g., the composition surface 410). In addition, the particular presentation of the information and commands may differ depending on the form factor and capabilities of the device(s) on which the content authoring application and/or interface to the assisted content authoring productivity tool are provided.

Referring to FIG. 4A, in response to receiving a command for exploration of an item of the structured content provided in the interface 400 (e.g., via search command 411 or possibly explore command 344 of FIG. 3), updated structured content 421 can be provided, for example by a recommender engine that performs a lookup and/or search from a source accessible over a network. The lookup and/or search can involve using all of the previous structured content results and the user's selection to retrieve structured information related to at least one of the attributes and/or particular content of the previous results and the user's selection.

Advantageously, context for the exploration can be generated—even in a cold start scenario—by using the results of the previously retrieved structured content to refine, supplement, and even expand upon a user's initial expression of intent. Therefore, not only is the specific selection used to generate updated structured content 421, but also the previous structured content. In some cases where the user may have saved or otherwise marked some of the visual content for later insertion or exploration, the saved or marked content may also be used as context for the exploration.

In some cases, in response to receiving a command for exploration, the assisted content authoring productivity tool can traverse a tree (or "information graph") of linked or otherwise related information. The tree may exist at a resource, be generated during the search of structured content, or be a figurative tree of information resulting as the assisted content authoring productivity tool generates search queries based on the user's expression of intent and context of the previous search results (along with possible other context both available from the productivity application (or other content authoring application) and the user's additional input).

The structured content provided in the interface 400 can be used to present directions that the user can go. The user's selection of at least one of a portion of the targeted information, an outline of at least some of the targeted information, all of the targeted information, or some other part or portion of the targeted information presented in the interface can begin a traversal of a tree that follows a path into content related to the user's selection. This process can enable users to traverse a connected set of documents, iteratively refining the set and addressing the issue where there may not be sufficient context available directly from the authored content.

The refining does not necessarily require a narrowing of results. Rather, based on the entity type (e.g., article, movie, book, people, recipe, etc.) of the topic(s) and entity in the expression of intent and/or selected result, a guided search can be presented. The exploration search conducted by the assisted content authoring tool uses the structured data of the results and the context of the entire document (and prior results) to direct, expand, pivot and otherwise traverse paths of information. Each selection by the user can be leveraged.

While the exploration is taking place, the composition surface 410 may remain in the blank and/or cold start state. For cases where the user decides to insert some of the structured content and/or begin inputting content into the composition surface 410, that content can be used as context for a recommender engine (and the associated searching being conducted to provide exploration results in the interface 400). For example, referring to FIG. 4B, in response to receiving a selection to insert an outline (e.g., via insert outline command 342 of FIG. 3 or insert outline command 431—with or without a pre-selection of a particular content view 440), the heading(s) and subheadings from the structured content may be provided to the composition surface 410 and displayed as an outline 441 to the user within the composition surface 410.

For instance, a user may be writing a paper on "Hamlet" by William Shakespeare. The initial relevant information 401 retrieved by the assisted content authoring productivity tool can include the content available from Wikipedia and include headings/subheadings such as: Characters, Plot, Sources, Date, Analysis and Criticism (critical history, dramatic structure, and language), Context and Interpretation (religious, philosophical, psychoanalytic, feminist), and Performance history (Shakespeare's day to the Interregnum, restoration and $18^{th}$ century, $19^{th}$ century, $20^{th}$ century, Film and TV performances). Thus, when a user selects to insert the outline (e.g., via insert outline command 431), all or some (or selected) ones of these headings and subheadings may be inserted in to the composition surface 410 as outline 441.

Content may be input to the composition surface 410 from the interface 400 as well as through input mechanisms available from the content authoring application (e.g., copy and paste, input of text via a keyboard, input via a web clipper, and speech recognition as some examples). Accordingly, a user may use the outline inserted into the composition surface 410 and/or input additional content to the composition surface 410 while also continuing to explore topics using the assisted content authoring tool.

Referring to FIG. 4C, the outline 441 and any other content input to the composition surface 410 may be used as context along with the previous structured content results to generate further updated structured content 451. The exploration may be as a result of the insertion of the outline, a user's selection of content from the interface 400 (where this occurs, the selection can also be used to garner the further updated structured content), a user's command to further search (e.g., via search command 411), or a combination thereof.

As a content author gains momentum in a document, context grows as well. Parts that have been already been authored now offer the opportunity to go deeper, and further research on what a user has just written (and/or previously selected for exploration) can lead to richer content. Entities may be identified from the content authored in the composition surface and used to yield high value research results. The structure of the document may further be used as a signal to yield additional results. For example, given a document which contains a structure of an outline, the context of the content within a particular section of the outline can be used to present insights about that section. For instance, if a user included a section about the 1960 U-2 incident on a paper about Eisenhower, the nested information about Powers may result in an exploration about Powers and a return of an image of a bridge and information about the bridge due to the bridge being described as the one on which Powers was exchanged with a Soviet spy.

In some cases, the assisted content authoring tool can analyze the content created or otherwise input into the composition surface 410 for recognizable entities and provide additional information about the recognized entities. In one such case, the content input to the composition surface 410 can be considered the expression of intent (and a specific user input interface that is separate from the composition surface may be omitted). In some cases, a "clipping" from a web clipper can initiate the assisted content authoring tool and the clip's content can be used as the expression of intent to generate structured content results.

The additional information and/or the recognized entity in the composition surface 410 may, when selected for exploration by a user, be another point of entry for the recommender engine to retrieve structured content and enable exploration by a user.

The analysis of the content in a composition surface may be performed in response to a user command. In some cases, the analysis of the content in the composition surface may be carried out in parallel to a spelling/grammar check so that recognized entities can be indicated and additional information (of structured content) presented about those recognized entities can be provided.

The presentation of the additional information can be helpful for a user that would like to know more about the topic they wrote about and may or may not realize that there is potentially relevant information available to supplement their creation.

Figure 5:
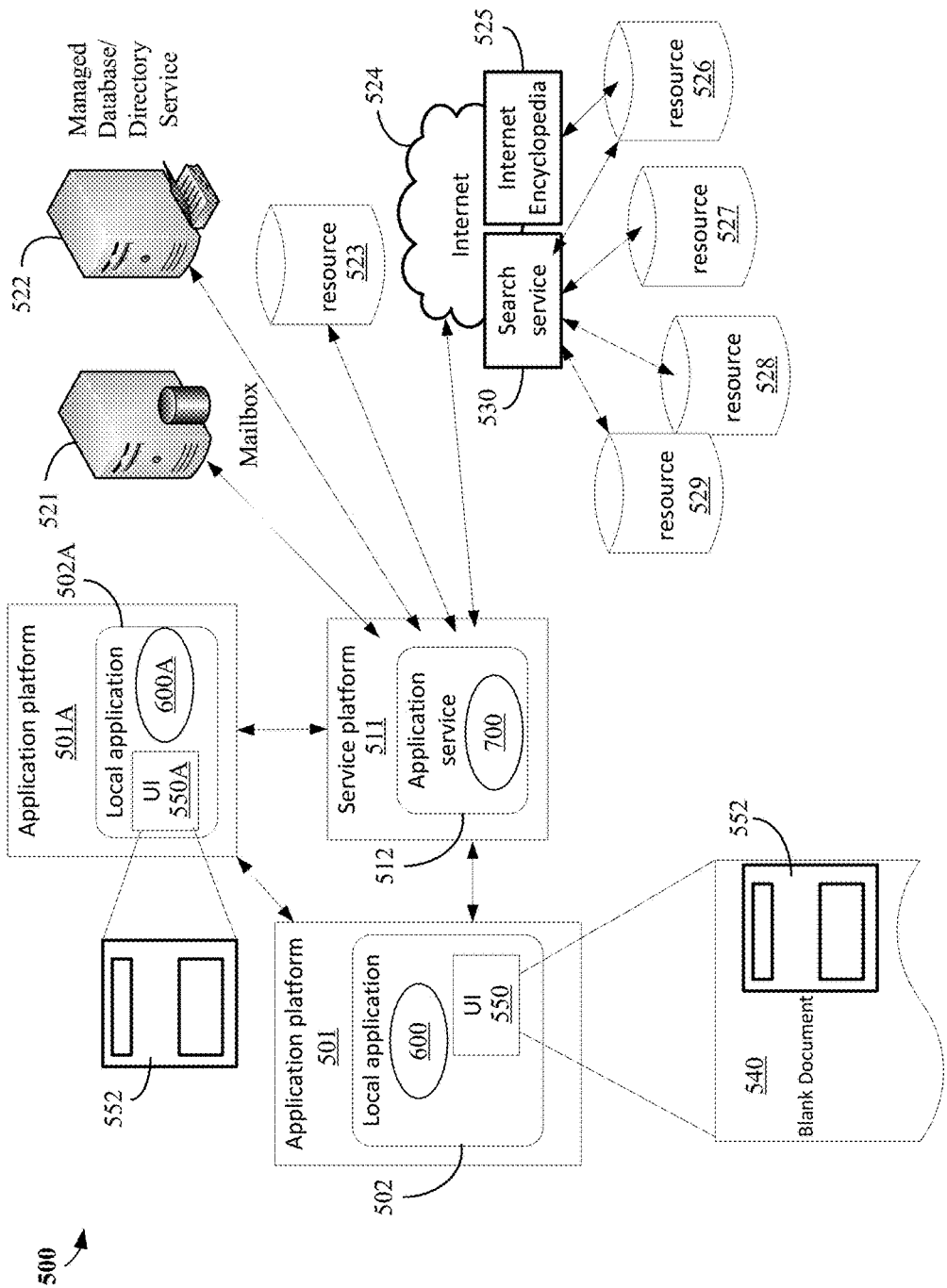
FIG. 5 illustrates service architecture and certain associated operational scenarios demonstrating various aspects of assisted content authoring.

FIG. 5 illustrates service architecture and certain associated operational scenarios demonstrating various aspects of assisted content authoring. Service architecture 500 includes application platform 501 (and/or application platform 501A) and service platform 511. Local application 502 is executed within the context of application platform 501, while application service 512 is hosted by and runs within the context of service platform 511.

Application service 512 can host, be integrated with, or be in communication with data sources such as one or more of a mailbox 521, managed database/directory service 522, structured content store 523, and Internet resources 524 such as an Internet Encyclopedia 525 and associated content store 526 and resources (e.g., 526, 527, 528, 529) available through a search service 530, containing, for example, web sites, web pages, contacts databases, Active Directory database, lists, maps, accounts, and the like.

In some cases, local application 502 may be considered remote from application service 512 in that each are implemented on separate computing platforms. In such situations, local application 502 and application service 512 may communicate by way of data and information exchanged between application platform 501 and service platform 511 over a suitable communication link or links (not shown). In other cases, the features and functionality provided by local application 502 and application service 512 can be co-located or even integrated as a single application.

In addition to the above mentioned features and functionality available across application and service platforms, aspects of the described assisted content authoring tool can be carried out across multiple application platforms (on a same or different computing device). For example, some functionality for the assisted content authoring tool may be provided by local application 502A on application platform 501A and the local applications 502 and 502A may communicate by way of data and information exchanged between the two application platforms 501 and 501A and/or by way of data and information exchanged with the service platform 511 or other service platforms (not shown).

Figure 6A:
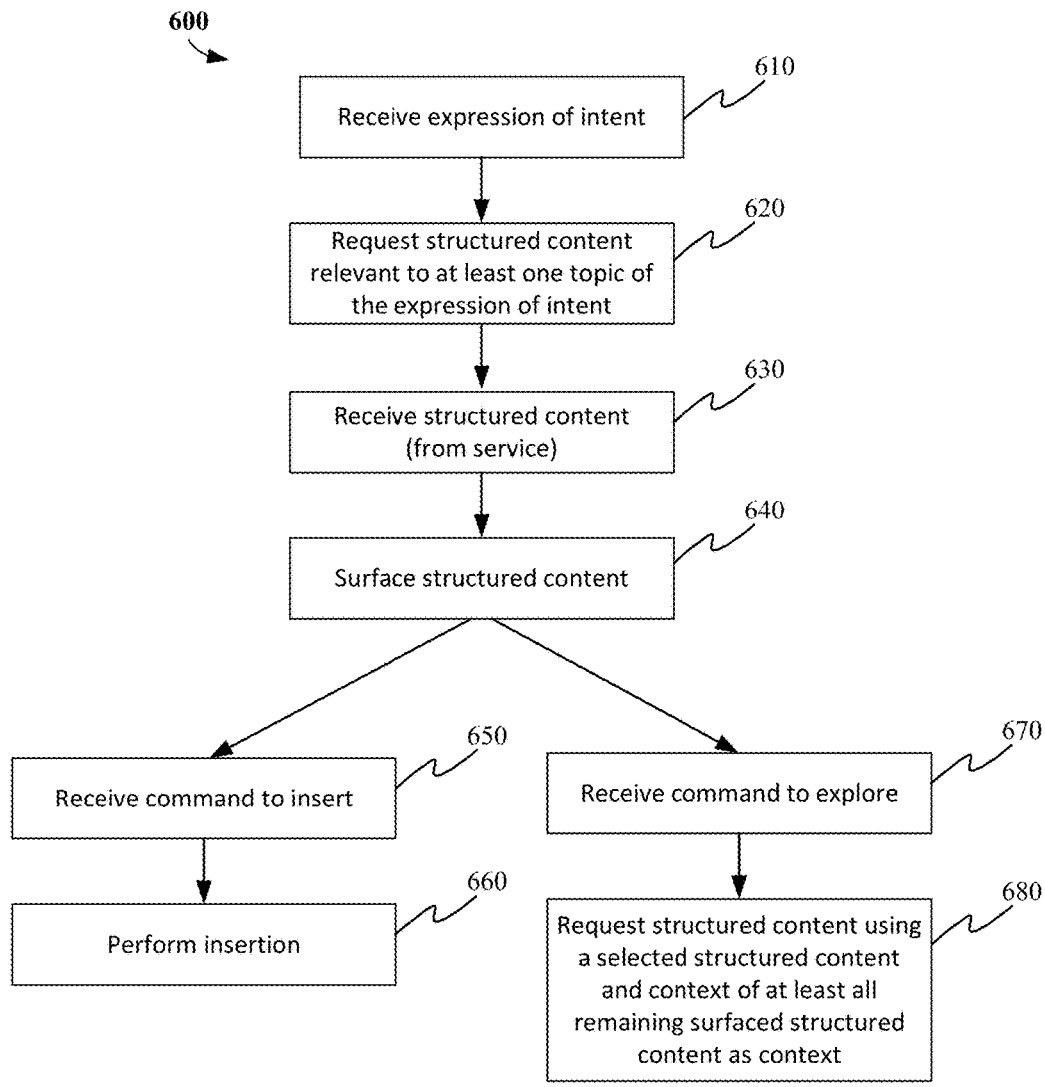
FIGS. 6A and 6B illustrate some example implementations of an assisted content authoring process that may be employed by a local application.
Figure 6B:
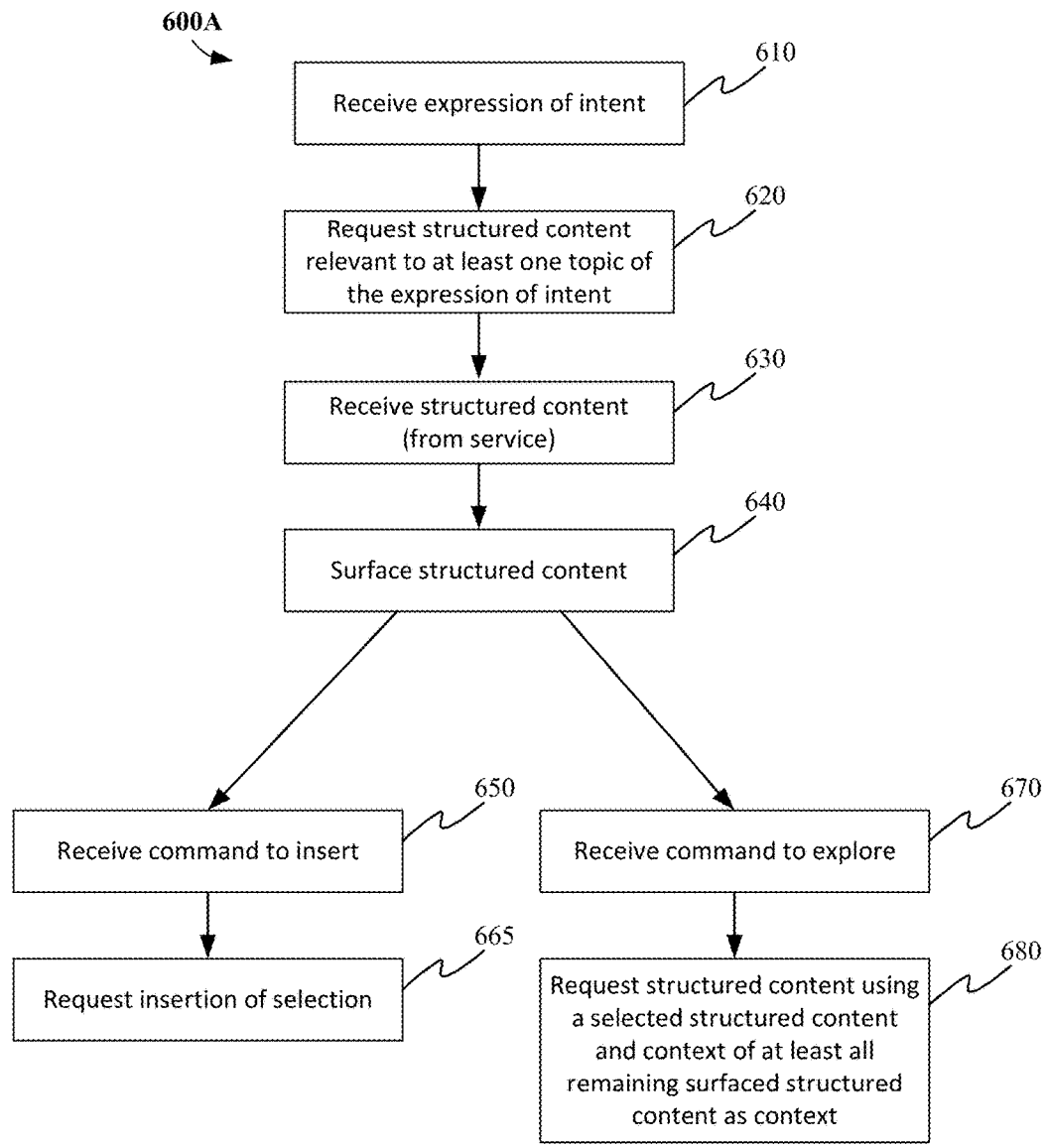
Figure 8:
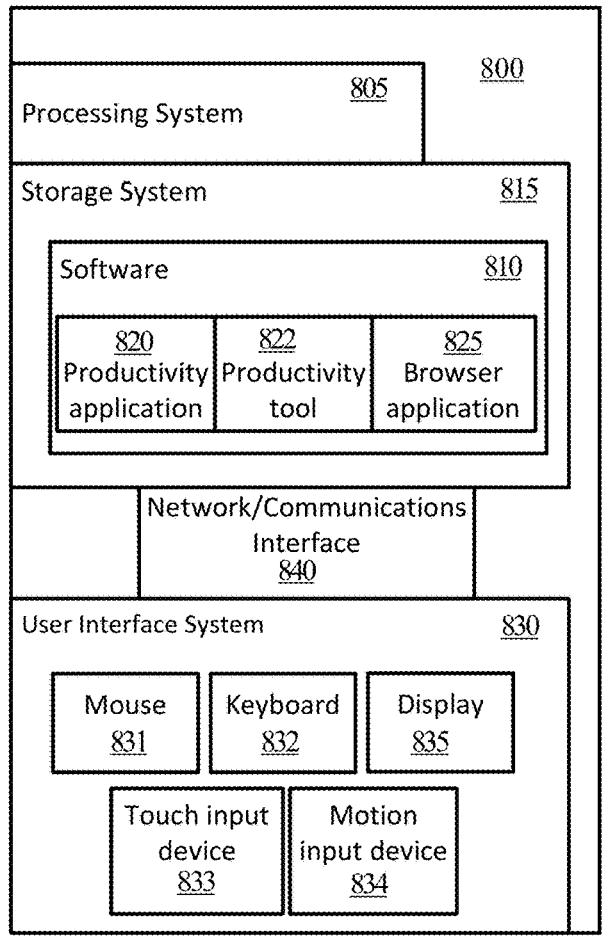
FIG. 8 illustrates components of a computing device that may be used in certain implementations described herein.

Application platforms 501 and 501A are representative of any physical or virtual computing system, device, or collection thereof capable of hosting local applications 502 and 502A (and capable of employing processes 600 and 600A respectively described with respect to FIGS. 6A and 6B). Examples include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing system 800 illustrated in FIG. 8 is representative.

Local applications 502, 502A are representative of any software application, module, component, or collection thereof, capable of implementing user interface 550, 550A (and corresponding productivity tool for assisted content authoring interface 552). Examples of applications in which assisted content authoring may be provided include, but are not limited to, word processing applications, spreadsheet applications, presentation applications, web browsers, email applications, blogging and micro-blogging applications, social networking applications, and gaming applications.

Local application 502, 502A may be a browser-based application that executes in the context of a browser application. In some implementations, local application 502, 502A may execute in the context of or in association with a web page, web site, web service, or the like. However, local application 502, 502A may also be a locally installed and executed application, a streamed application, a mobile application, or any combination or variation thereof. Local application 502, 502A may be implemented as a standalone application or may be distributed across multiple applications.

Figure 7:
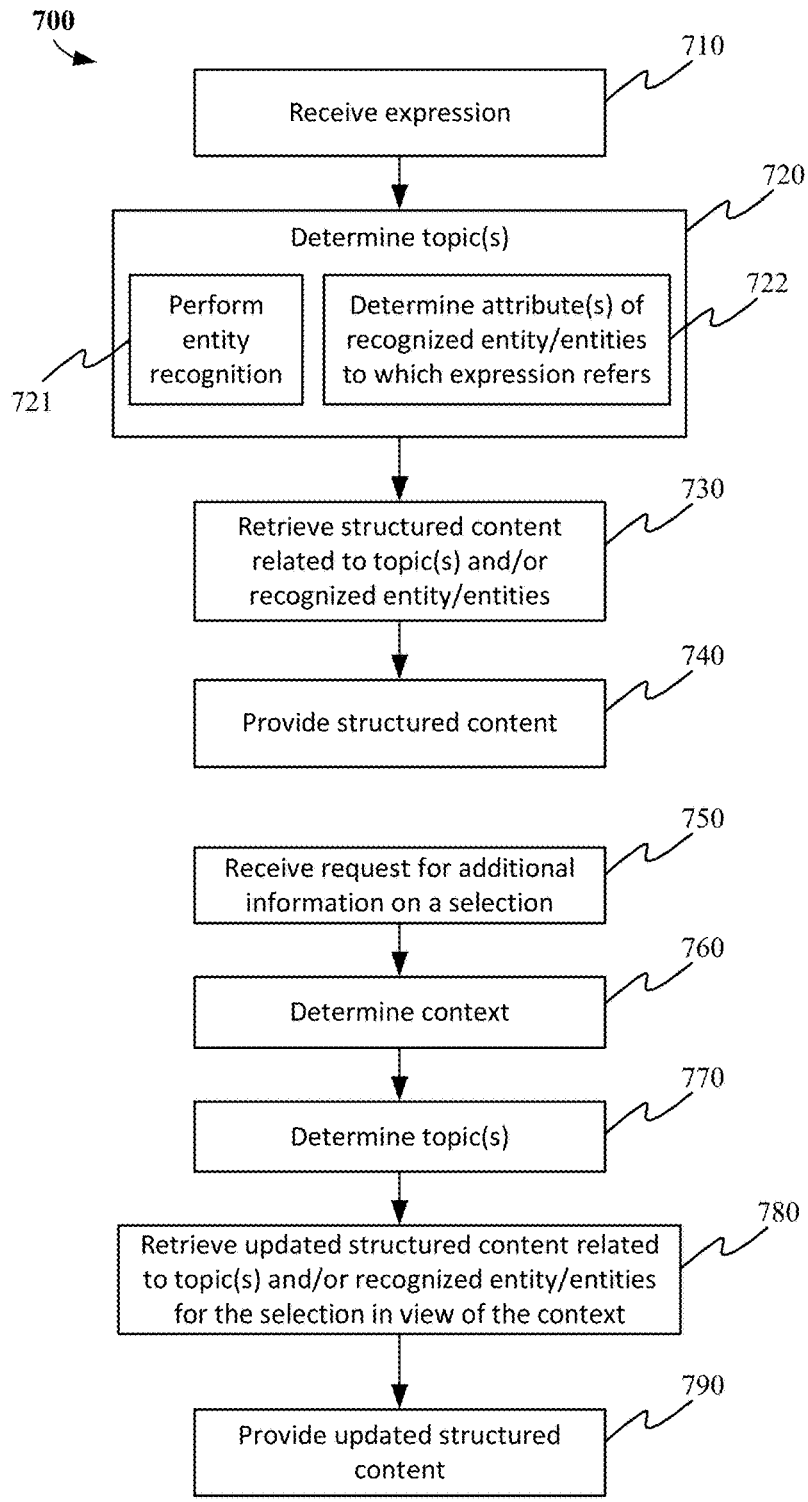
FIG. 7 illustrates an example implementation of an assisted content authoring process that may be employed by an application service.
Figure 9:
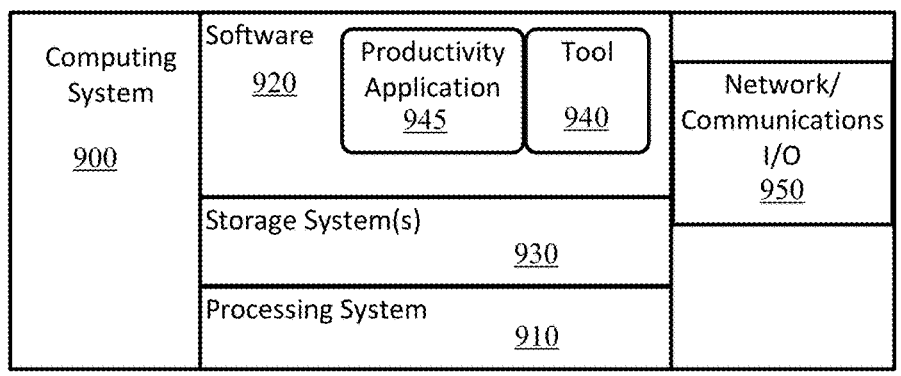
FIG. 9 illustrates components of a computing system that may be used to implement certain methods and services described herein.

Service platform 511 is representative of any physical or virtual computing system, device, or collection thereof capable of hosting all or a portion of application service 512 and implementing all or portions of process 700 described with respect to FIG. 7. Examples of service platform 511 include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing system 800 illustrated in FIG. 8 is representative. Further examples of service platform 511 include, but are not limited to, web servers, application servers, rack servers, blade servers, virtual machine servers, or tower servers, as well as any other type of computing system, of which computing system 900 of FIG. 9 is representative. In some scenarios, service platform 511 may be implemented in a data center, a virtual data center, or some other suitable facility.

Application service 512 is any software application, module, component, or collection thereof capable of providing an application service to local application 502 (and/or 502A). In some cases, application service 512 is a stand-alone application providing a productivity tool for assisted content authoring. In some cases, application service 512 includes a productivity application (or other application) for which assisted content authoring may be provided. Examples of productivity applications (and other applications) for which assisted content authoring may be provided include, but are not limited to, word processing applications, spreadsheet applications, presentation applications, web browsers, email applications, blogging and micro-blogging applications, social networking applications, and gaming applications.

In operation, local application 502 can render document 540 in user interface 550. Document 540 may be stored locally, on the "cloud," on an enterprise server, or a combination thereof. Document 540, when first created, may initially be blank. In some cases, document 540 contains content a user has already authored. An assisted content authoring tool interface 552 can surface in the user interface 550 as part of the menu/tool options of the local application or be accessible via a user interface 550A of local application 502A. It should be understood that although a "document" 540 is particularly described, document 540 may represent any file formats/types suitable for content authoring via a productivity application or other content authoring application.

FIGS. 6A and 6B illustrate some example implementations of an assisted content authoring process that may be employed by a local application. Referring to FIG. 6A, process 600 can be initiated when an expression of intent is received by the local application (610). The expression may be sent to the application service with a request for structured content relevant to at least one topic of the expression of intent (620). Potentially relevant structured content can be received from the application service (630) and surfaced by the local application (640). The structured content can be surfaced according to a content view. The content view can be a preview, template version, as-is, or a combination thereof.

When the local application receives a command to insert (650), the insertion into a document (or other file) can be performed (660). Various insertion commands may be available including, but not limited to, paste, send, insert outline, insert selection, insert object, and the like. The content being inserted can be one or more of the topic results of the structured content or certain properties or attributes thereof.

When the local application receives a command to explore (670), a request for structured content relevant to a selected entity, topic, string, image, or text may be provided to the application service (680). Context can be provided to the application service to assist in the request. In some cases, the context of the previously provided structured content can be provided from the local application to the application service; while in other cases, the application service may keep track of the previously provided structured content that is used as context for the search.

Sometimes the local application through which an expression of intent is received is running on a separate platform or device than that providing an interface (e.g., composition surface) to a productivity application. In an example process 600A as illustrated in FIG. 6B, the expression of intent can be received by a local application (610), a request for structured content relevant to at least one topic of the expression of intent can be sent to an application service (620), structured content can be received from the application service (630), and the structured content can be surfaced in an assisted content authoring tool interface (640).

In this case, since the productivity application is on a separate application platform, when a command to insert is received by the local application (650), the local application sends a request to an application service (for the insertion of a selection (or other identified content or topic result) into a document (or other file) (665). The application service may be an independent service for assisted content authoring or may be a service for the productivity application (either having the assisted content authoring tool or having an application programming interface (API) through which content can be inserted into an identified document (or other file). The service for the productivity application may be local or web-based.

When the local application receives a command to explore (670), a request for structured content relevant to a selected entity, topic, string, image, or text may be provided to the application service (680). Context can be provided to the application service to assist in the request. In some cases, the context of the previously provided structured content can be provided from the local application to the application service; while in other cases, the application service may keep track of the previously provided structured content that is used as context for the search.

FIG. 7 illustrates an example implementation of an assisted content authoring process that may be employed by an application service. Referring to FIG. 7 and process 700, an application service can receive an expression of intent from a productivity tool (710). The application service can determine one or more topics from the expression (720). For example, entity recognition can be performed (721) to identify recognizable entities from the text of the expression. Attributes of the recognized entities can be determined (722), and these attributes can be used to determine the one or more topics from the expression.

For instance, in response to receiving an expression of intent via the assisted content authoring tool interface 552 at the local application, the application service 512 identifies or otherwise examines the expression of intent for recognizable entities and/or domains, for example by named entity recognizers and dictionary look-ups. A domain is a category for a series of entities (or items). For example, a domain may be books. An entity refers to a concept (person, organization, location, service, temporal, numeric, monetary etc.) that a document (or other file) is discussing or describing. In the book domain example, they entity may be a specific book. The aspects are the properties or attributes of the entity that are mentioned about the entity and which may be of interest to the user. In the case of a book as an entity, the genre or the premise/plot are examples of the aspects.

A topic is a distribution of words and that can correspond to an aspect of an entity (and sometimes the entity itself). A topic serves as a subject or category of related information. The topic of an expression can be used for entity disambiguation (e.g., using Latent Dirichlet Allocation (LDA) and its hierarchical variants). Entity disambiguation refers to the identifying of entities from text and their labeling with one of several entity type labels. The text can be referred to as a surface form. An entity can be referred to by multiple surface forms, and a surface form can refer to multiple entities. For example, the entity Michael Jordan may be referred to as "No. 23" and "MJ"; and the surface form "No. 23" may refer to multiple entities such as the two basketball players (Michael Jordan and Lebron James), the number 23, and the movies (23 and The Number 23).

In some cases, Wikipedia may be used not only to provide the structured content, but also as a comprehensive reference catalog for large-scale entity disambiguation. Each Wikipedia entity can have a separate page, and a vast network of internal links annotate words in the body of pages with the entities that they refer to.

The application service 512 can determine one or more topics from the expression of intent and identify structured content related to the one or more topics. For example, the application service 512 may identify the structured content from the data sources associated with, or accessible by, the application service (e.g., resources 521, 522, 523, 524, 525, 526, 527, 528, 529).

Accordingly, structured content related to the topics and/or the recognized entities can be retrieved (730). For instance, the application service can request a search of a resource or directly search a resource containing structured content. As an example, an online encyclopedia can be queried using the identified entities and topics, and the pages containing the structured content associated with the topic can be received for use by the assisted content authoring productivity tool. Once the structured content is retrieved, the structured content can be provided to a local application having an interface to the productivity tool for assisted content authoring (740).

Similarly, when the document 540 contains content, the application service can identify entities from the information in the document 540 and use those identified entities along with the entities identified in the expression of intent to determine one or more topics for which structured content is retrieved. The content in the document may contain various entries, such as text, words, strings, numbers, symbols, images and the like. An entry may be recognizable as an entity based on various characteristics.

The application service can also support exploration scenarios so that when a request for structured content is received (750), for example, containing a selection of specified content, a topic, entity, string, image, or text, additional information can be provided that is related to the selection. To facilitate the search and/or recommendation of related structured content, context can be determined (760). The context for the selection, at a minimum, includes the previously retrieved structured content. In some cases, at least some of the context is provided with the request. In some cases, at least some of the context is available to the application service directly, for example by being stored in an associated resource.

The application service can determine one or more topics for exploration from the selection and the context (770). In some cases, the topic determination can involve performing entity recognition and determining attributes such as described with respect to operations 721 and 722. The application service can retrieve updated structured content related to the topic(s) and/or recognized entities for the selection in view of the context (780). For example, the application service can request a search of a resource or directly search a resource containing structured content. Once the structured content is retrieved, the structured content can be provided to a local application having an interface to the productivity tool for assisted content authoring (790).

FIG. 8 illustrates components of a computing device that may be used in certain implementations described herein; and FIG. 9 illustrates components of a computing system that may be used to implement certain methods and services described herein.

Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 800 may be incorporated to implement a particular computing device. System 800 can be used in implementing a computing device embodying application platforms 501 and 501A, a computing device having display 105, separate device 115, and the like.

System 800 includes a processing system 805 of one or more processors to transform or manipulate data according to the instructions of software 810 stored on a storage system 815. Examples of processors of the processing system 805 include general purpose central processing units, application specific processors, and logic devices, as well as any other type of processing device, combinations, or variations thereof. The processing system 805 may be, or is included in, a system-on-chip (SoC) along with one or more other components such as network connectivity components, sensors, video display components.

The software 810 can include an operating system and application programs such as a productivity application 820, productivity tool 822, and/or web browsing application 825. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 8, can be thought of as additional, nested groupings within the operating system space, each containing an OS, application programs, and APIs.

Storage system 815 may comprise any computer readable storage media readable by the processing system 805 and capable of storing software 810 including the productivity application 820, productivity tool 822, and/or web browsing application 825.

Storage system 815 may include volatile and nonvolatile, removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium a propagated signal or carrier wave.

In addition to storage media, in some implementations, storage system 815 may also include communication media over which software may be communicated internally or externally. Storage system 815 may be implemented as a single storage device but may also be implemented across multiple storage devices or sub-systems co-located or distributed relative to each other. Storage system 815 may include additional elements, such as a controller, capable of communicating with processing system 805.

Software 810 may be implemented in program instructions and among other functions may, when executed by system 800 in general or processing system 805 in particular, direct system 800 or the one or more processors of processing system 805 to operate as described herein.

In general, software may, when loaded into processing system 805 and executed, transform computing system 800 overall from a general-purpose computing system into a special-purpose computing system customized to retrieve and process the information for facilitating content authoring as described herein for each implementation. Indeed, encoding software on storage system 815 may transform the physical structure of storage system 815. The specific transformation of the physical structure may depend on various factors in different implementations of this description. Examples of such factors may include, but are not limited to, the technology used to implement the storage media of storage system 815 and whether the computer-storage media are characterized as primary or secondary storage.

The system can further include user interface system 830, which may include input/output (I/O) devices and components that enable communication between a user and the system 800. User interface system 830 can include input devices such as a mouse 831, track pad (not shown), keyboard 832, a touch device 833 for receiving a touch gesture from a user, a motion input device 834 for detecting non-touch gestures and other motions by a user, a microphone for detecting speech (not shown), and other types of input devices and their associated processing elements capable of receiving user input.

The user interface system 830 may also include output devices such as display screens 835, speakers (not shown), haptic devices for tactile feedback (not shown), and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display 835 in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830 including user interface software may support a graphical user interface, a natural user interface, or any other type of user interface. For example, the interfaces for the productivity application and/or the productivity tool for assisted content authoring (and corresponding functionality) described herein may be presented through user interface system 830.

Communications interface 840 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 800 is generally intended to represent a computing system with which software is deployed and executed in order to implement an application, component, or service for a productivity tool for assisted content authoring as described herein. In some cases, aspects of computing system 800 may also represent a computing system on which software may be staged and from where software may be distributed, transported, downloaded, or otherwise provided to yet another computing system for deployment and execution, or yet additional distribution.

Certain aspects described herein, such as those carried out at service platform 511 may be performed on a system such as shown in FIG. 9. Referring to FIG. 9, system 900 may be implemented within a single computing device or distributed across multiple computing devices or sub-systems that cooperate in executing program instructions. The system 900 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 900 can include a processing system 910, which may include one or more processors and/or other circuitry that retrieves and executes software 920 from storage system 930. Processing system 910 may be implemented within a single processing device but may also be distributed across multiple processing devices or sub-systems that cooperate in executing program instructions.

Storage system(s) 930 can include any computer readable storage media readable by processing system 910 and capable of storing software 920. Storage system 930 may be implemented as a single storage device but may also be implemented across multiple storage devices or sub-systems co-located or distributed relative to each other. Storage system 930 may include additional elements, such as a controller, capable of communicating with processing system 910. Storage system 930 may also include storage devices and/or sub-systems on which data such as entity-related information is stored.

Software 920 may be implemented in program instructions and among other functions may, when executed by system 900 in general or processing system 910 in particular, direct the system 900 or processing system 910 to operate as described herein for assisted content authoring (as assistance tool 940) and/or providing a productivity application 945.

System 900 may represent any computing system on which software 920 may be staged and from where software 920 may be distributed, transported, downloaded, or otherwise provided to yet another computing system for deployment and execution, or yet additional distribution.

In embodiments where the system 900 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 950 may be included, providing communication connections and devices that allow for communication between system 900 and other computing systems (not shown) over a communication network or collection of networks (not shown) or the air.

Certain techniques set forth herein with respect to assisted content authoring may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered computer-readable "storage media."

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

Certain aspects of the invention provide the following non-limiting embodiments:

Example 1

One or more computer readable storage media having instructions stored thereon that, when executed by a processing system, direct the processing system to: request a set of structured content relevant to at least one topic of a received expression of intent; present the set of structured content of at least one topic result for inclusion in a content authoring application; in response to receiving an explore command to explore a selected search item from the set of structured content, request an updated set of structured content for the selected search item using context comprising the set of structured content of the at least one topic result; and present the updated set of structured content for the selected search item for inclusion in the content authoring application.

Example 2

The media of example 1, further comprising instructions stored thereon that, when executed by a processing system, direct the processing system to: in response to receiving an insert command to insert a selected insert item, insert the selected insert item into a content authoring surface of the content authoring application.

Example 3

The media of example 2, wherein the insert command to insert the selected insert item is a command to insert an outline for a specified topic result from the set of structured content, and in response to receiving the insert command to insert the selected item, the instructions direct the processing system to: insert an outline of a topic model for the specified topic result into the content authoring surface.

Example 4

The media of any of examples 1-3, further comprising instructions stored thereon that, when executed by a processing system, direct the processing system to: in response to receiving an insert command to insert a selected insert item, request the content authoring application to insert the selected insert item into a content authoring surface of the content authoring application.

Example 5

The media of any of examples 1-4, wherein the expression comprises content input to a content authoring surface of the content authoring application.

Example 6

The media of any of examples 1-5, wherein the expression is received via a specific input field for receiving the expression.

Example 7

The media of any of examples 1-6, wherein the context further comprises at least a portion of content in the content authoring surface of the content authoring application.

Example 8

The media of any of examples 1-7, further comprising instructions stored thereon that, when executed by a processing system, direct the processing system to analyze content in the content authoring surface for recognizable entities; request one or more structured content results for at least one recognized entity of the recognizable entities in the content authoring surface; and present the one or more structured content results for inclusion in the content authoring application.

Example 9

The media of example 8, wherein in response to receiving an indication that at least a portion of the one or more structured content results is to be included in the content authoring application, providing the at least the portion of the results to another device on which the content authoring application is executed.

Example 10

A method for assisting content authoring, the method comprising: identifying at least one topic from an expression of a user's intent; retrieving structured content associated with the at least one topic; and providing the structured content for a content authoring application.

Example 11

The method of example 10, wherein the structured content is retrieved by an assisted content authoring service from at least one source of structured content over a network and provided for directly inputting into the content authoring application by the assisted content authoring service.

Example 12

The method of any of examples 10-11, further comprising: receiving a request for exploration of a selection of content from the structured content; retrieving an updated structured content for the selection of content using at least the structured content associated with the at least one topic as context; and providing the updated structured content.

Example 13

The method of example 12, wherein the selection of content comprises a recognizable entity, identifiable topic or both.

Example 14

The method of any of examples 10-13, wherein the expression is a natural language expression of a user's intent.

Example 15

The method of any of examples 10-14, wherein retrieving the structured content associated with the at least one topic comprises querying an online encyclopedia and receiving at least a page containing the structured content associated with the topic.

Example 16

The method of any of examples 10-15, wherein identifying at least one topic from the expression of the user's intent comprises: performing entity recognition with respect to the expression; and determining one or more attributes of each entity recognized during the performing of the entity recognition.

Example 17

The method of any of examples 10-16, wherein the expression comprises content input to a content authoring surface of the content authoring application.

Example 18

The method of any of examples 10-17, wherein the expression is received via a specific input field for receiving the expression.

Example 19

The method of any of examples 10-18, wherein the context further comprises at least a portion of content in the content authoring surface of the content authoring application.

Example 20

An apparatus comprising: a user interface system; one or more storage media; and instructions stored on at least one of the one or more storage media that, when executed by a processor of the apparatus, direct the processor to: display a document in a content authoring surface of a content authoring application; request a set of structured content relevant to at least one topic generated from an expression of intent received via the user interface system; in response to receiving the set of structured content, provide the set of structured content to an interface for an assisted content authoring tool; and insert a selected item from the set of structured content provided to the interface for the assisted content authoring tool into the document in the content authoring surface of the content authoring application.

Example 21

The apparatus of example 20, further comprising a companion device through which a user may initiate the request of the set of structured content and/or the insert of the selected item, the interface for the assisted content authoring tool optionally being available at the companion device.

Example 22

The apparatus of any of examples 20-21, wherein the content authoring application and the interface for the assisted content authoring tool is displayed via the user interface system.

Example 23

The apparatus of any of examples 20-22, wherein the instructions further direct the processing system to provide an outline for a specified topic result from the set of structured content for insertion into the document.

Example 24

The apparatus of any of examples 20-23, wherein the instructions further direct the processing system to: surface the structured content in the interface for the assisted content authoring tool according to an entity-based template.

Example 25

The apparatus of any of examples 20-24, wherein the instructions further direct the processing system to: request an updated set of structured content for a selected search item from the set of structured content, wherein context for generating the updated set of structured content for the selected search item comprises the set of structured content of the at least one topic result.

Example 26

The apparatus of example 25, wherein the context further comprises at least a portion of content in the content authoring surface of the content authoring application.

Example 27

The apparatus of example 25 or 26, wherein the instructions further direct the processing system to: analyze content in the content authoring surface for recognizable entities; request one or more structured content results for at least one recognized entity of the recognizable entities in the content authoring surface; and present the one or more structured content results for inclusion in the content authoring application.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. One or more computer readable storage media having instructions stored thereon that, when executed by a processing system, direct the processing system to:
   request a set of structured content relevant to at least one topic of a received expression of intent, wherein the expression of the user's intent is input through an input field within a user interface of the content authoring application;
   present the set of structured content of at least one topic result for inclusion in the content authoring application, wherein the content authoring application is a notebook application or a word processing application;
   in response to receiving an explore command to explore a selected search item from the set of structured content, request to at least two data sources, an updated set of structured content for the selected search item, the request including the selected search item and the set of structured content of the at least one topic result as context:
   receive, from the at least two data sources, the updated set of structured content for the selected search item; and
   present the updated set of structured content for the selected search item for inclusion in the content authoring application.

2. The media of claim 1, further comprising instructions stored thereon that, when executed by a processing system, direct the processing system to:
   in response to receiving an insert command to insert a selected insert item, insert the selected insert item into a content authoring surface of the content authoring application.

3. The media of claim 2, wherein the insert command to insert the selected insert item is a command to insert an outline for a specified topic result from the set of structured content, and in response to receiving the insert command to insert the selected item, the instructions direct the processing system to: insert an outline, comprising at least a heading, of a topic model for the specified topic result into the content authoring surface.

4. The media of claim 1, further comprising instructions stored thereon that, when executed by a processing system, direct the processing system to:
   in response to receiving an insert command to insert a selected insert item, request the content authoring application to insert the selected insert item into a content authoring surface of the content authoring application.

5. The media of claim 1, wherein the expression comprises content input to a content authoring surface of the content authoring application.

6. The media of claim 1, wherein the expression is received via a specific input field for receiving the expression.

7. The media of claim 1, wherein the context further comprises at least a portion of content in the content authoring surface of the content authoring application.

8. The media of claim 1, further comprising instructions stored thereon that, when executed by a processing system, direct the processing system to:
   analyze content in the content authoring surface for recognizable entities;

request one or more structured content results for at least one recognized entity of the recognizable entities in the content authoring surface; and present the one or more structured content results for inclusion in the content authoring application.

9. A method for assisting content authoring, the method comprising:

identifying, at a computing system, at least one topic from both an expression of a user's intent with respect to authoring content in a content authoring application and context, wherein the expression of the user's intent is input through an input field within a user interface of the content authoring application, and wherein the content authoring application is a notebook application or a word processing application and the context is at least one of recorded user interests, a field of work, an authoring history, and documents a user previously accessed or read, or at least a portion of content in a composition surface of the content authoring application, the recorded user interests being stored in an associated resource;

retrieving, over a network, structured content associated with the at least one topic identified from the expression of the user's intent; and providing the structured content for display within the user interface of the content authoring application and insertion into the composition surface of the content authoring application.

10. The method of claim 9, further comprising:

receiving a request for exploration of a selection of content from the structured content;

retrieving an updated structured content for the selection of content using at least the structured content associated with the at least one topic as context; and providing the updated structured content.

11. The method of claim 10, wherein the selection of content comprises a recognizable entity, identifiable topic or both.

12. The method of claim 9, wherein the expression is a natural language expression of a user's intent.

13. The method of claim 9, wherein retrieving the structured content associated with the at least one topic comprises querying an online encyclopedia and receiving at least a page containing the structured content associated with the topic.

14. The method of claim 9, wherein identifying at least one topic from the expression of the user's intent comprises:

performing entity recognition with respect to the expression; and determining one or more attributes of each entity recognized during the performing of the entity recognition.

15. An apparatus comprising:

a user interface system;

one or more storage media; and instructions stored on at least one of the one or more storage media that, when executed by a processor of the apparatus, direct the processor to:

display a document in a content authoring surface of a content authoring application, wherein the content authoring application is a notebook application or a word processing application;

request a set of structured content relevant to at least one topic generated from both an expression of intent and context received via the user interface system, the expression of intent being received via an input field of the user interface system separate from the content authoring surface, and wherein the context is at least one of recorded user interests, a field of work, an authoring history, and documents a user previously accessed or read, or at least a portion of content in the content authoring surface of the content authoring application, the recorded user interests being stored in an associated resource;

in response to receiving the set of structured content, provide the set of structured content to an interface for an assisted content authoring tool; and insert a selected item from the set of structured content provided to the interface for the assisted content authoring tool into the document in the content authoring surface of the content authoring application.

16. The apparatus of claim 15, wherein the instructions further direct the processing system to:

provide an outline, comprising at least a heading, for a specified topic result from the set of structured content for insertion into the document.

17. The apparatus of claim 15, wherein the instructions further direct the processing system to:

surface the structured content in the interface for the assisted content authoring tool according to an entity-based template.

18. The apparatus of claim 15, wherein the instructions further direct the processing system to:

request an updated set of structured content for a selected search item from the set of structured content, wherein context for generating the updated set of structured content for the selected search item comprises the set of structured content of the at least one topic result.

19. The apparatus of claim 18, wherein the context further comprises at least a portion of content in the content authoring surface of the content authoring application.

20. The apparatus of claim 18, wherein the instructions further direct the processing system to:

analyze content in the content authoring surface for recognizable entities;

request one or more structured content results for at least one recognized entity of the recognizable entities in the content authoring surface; and present the one or more structured content results for inclusion in the content authoring application.

* * * * *